(12) United States Patent
Natarajan et al.

(10) Patent No.: US 10,343,214 B2
(45) Date of Patent: Jul. 9, 2019

(54) METHOD FOR CHANNEL FORMATION IN BINDER JET PRINTING

(71) Applicant: General Electric Company, Schenectady, NY (US)

(72) Inventors: Arunkumar Natarajan, Niskayuna, NY (US); Carlos Bonilla Gonzalez, Schenectady, NY (US); Vadim Bromberg, Schenectady, NY (US); Jeffrey Jon Schoonover, Colonie, NY (US); Srikanth Chandrudu Kottilingam, Simpsonville, SC (US); Prabhjot Singh, Rexford, NY (US); Kwok Pong Chan, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 0 days.

(21) Appl. No.: 15/436,344

(22) Filed: Feb. 17, 2017

(65) Prior Publication Data
US 2018/0236731 A1   Aug. 23, 2018

(51) Int. Cl.
*B22F 3/105* (2006.01)
*B22F 3/10* (2006.01)
(Continued)

(52) U.S. Cl.
CPC ............ *B22F 3/1021* (2013.01); *B22F 3/008* (2013.01); *B28B 1/001* (2013.01); *B28B 11/243* (2013.01); *B29C 64/153* (2017.08); *B29C 64/40* (2017.08); *B33Y 10/00* (2014.12); *B33Y 40/00* (2014.12); *B22F 2999/00* (2013.01); *B29K 2505/08* (2013.01); *B29K 2509/02* (2013.01); *B29L 2031/7504* (2013.01)

(58) Field of Classification Search
CPC ...................................................... B22F 3/1055
See application file for complete search history.

(56) References Cited

U.S. PATENT DOCUMENTS 5,204,055 A    4/1993  Sachs et al.
5,940,674 A *  8/1999  Sachs ...................... B22F 3/115
                                                       264/414

(Continued)

OTHER PUBLICATIONS

U.S. Appl. No. 15/205,661, filed Jul. 8, 2016, Kelkar et al.

(Continued)

*Primary Examiner* — Christopher S Kessler
(74) *Attorney, Agent, or Firm* — Fletcher Yoder, P.C.

(57) ABSTRACT

A method of binder jet printing a part includes depositing a layer of a powder on a working surface and selectively printing a binder solution comprising a binder into the layer of powder in a first pattern to generate a printed layer. The pattern is representative of a structure of a layer of the part. The method also includes selectively printing a channel support agent solution comprising a channel support agent into the layer of powder to generate a green body. The channel support agent is selectively printed in a second pattern representative of an internal channel of the part. The method further includes heating the green body part above a first temperature to remove the binder and generate a brown body part and heating the brown body part above a second temperature to sinter the powder to generate the part having the internal channel generated from removal of the channel support agent.

18 Claims, 9 Drawing Sheets

(51) Int. Cl.
  B28B 1/00      (2006.01)
  B33Y 10/00     (2015.01)
  B22F 3/00      (2006.01)
  B28B 11/24     (2006.01)
  B29C 64/153    (2017.01)
  B29C 64/40     (2017.01)
  B33Y 40/00     (2015.01)
  B29L 31/00        (2006.01)
  B29K 505/08       (2006.01)
  B29K 509/02       (2006.01)

(56)          References Cited

U.S. PATENT DOCUMENTS 6,589,471 B1 *  7/2003  Khoshnevis .......... B33Y 10/00
                                                      264/497
  8,017,055 B2    9/2011  Davidson et al.
  8,185,229 B2    5/2012  Davidson
  8,221,858 B2    7/2012  Mannella et al.
  8,827,681 B2    9/2014  Chen et al.
  2004/0084814 A1 5/2004  Boyd et al.

OTHER PUBLICATIONS

Schueren, J.P. Kruth, et al.; "Powder deposition in selective metal powder sintering", Rapid Prototyping Journal, vol. 1, Issue: 3, pp. 23-31, 1995.
Lee, Won-Hee, et al.; "Strength and Processing Properties using a Photopolymer Resin in a Powder-based 3DP Process", SICE-ICASE, 2006. International Joint Conference, pp. 3674-3677, Oct. 18-21, 2006, Busan.

* cited by examiner

METHOD FOR CHANNEL FORMATION IN BINDER JET PRINTING

BACKGROUND

The subject matter disclosed herein relates to additive manufacturing, and more particularly, to binder jetting additive manufacturing techniques for in situ formation of channels in printed articles.

Additive manufacturing, also known as 3D printing, generally involves printing an article one layer at a time using specialized systems. In particular, a layer of a material (e.g., a metal and/or ceramic powder bed) may be deposited on a working surface and bonded with another layer of the same or a different material. Additive manufacturing may be used to manufacture articles (e.g., fuel nozzles, fuel injectors, turbine blades, etc.) from computer aided design (CAD) models using techniques such as, but not limited to, metal laser melting, laser sintering, and binder jetting. These additive manufacturing techniques melt, sinter, and/or chemically bind layers of material to generate the desired article. Additive manufacturing may facilitate manufacturing of complex articles and enable enhanced flexibility for customization of articles compared to other manufacturing techniques, such as molding (e.g., cast molding, injection molding). Additionally, additive manufacturing can reduce the overall manufacturing costs associated with generating these complex articles compared to molding techniques generally used.

BRIEF DESCRIPTION

In one embodiment, a method of binder jet printing a part includes depositing a layer of a powder on a working surface and selectively printing a binder solution comprising a binder into the layer of powder in a first pattern to generate a printed layer. The pattern is representative of a structure of a layer of the part. The method also includes selectively printing a channel support agent solution comprising a channel support agent into the layer of powder to generate a green body. The channel support agent is selectively printed in a second pattern representative of an internal channel of the part. The method further includes heating the green body part above a first temperature to remove the binder and generate a brown body part and heating the brown body part above a second temperature to sinter the powder to generate the part having the internal channel generated from removal of the channel support agent.

In a second embodiment, a part manufactured via a binder jet printing process including the steps of: depositing a layer of a powder on a working surface and selectively printing a binder solution comprising a binder into the layer of powder in a first pattern to generate a printed layer. The pattern is representative of a structure of a layer of the part. The binder jet printing process also includes the steps of selectively printing a channel support agent solution having a channel support agent into the layer of powder to generate a green body. The channel support agent is selectively printed in a second pattern representative of an internal channel of the part. The binder jet printing process further includes the steps of heating the green body part above a first temperature to remove the binder and generate a brown body part and heating the brown body part above a second temperature to sinter the powder to generate the part having the internal channel generated from removal of the channel support agent.

In a third embodiment, a method of binder jet printing a part includes selectively printing a channel support agent solution having a channel support agent onto a working surface in a first pattern to generate a channel support layer. The first pattern is representative of an internal channel of the part. The method also includes depositing a layer of a powder on the working surface around the channel support agent and selectively printing a binder solution having a binder into the layer of the powder in a second pattern to generate a printed layer of a green body part. The pattern is representative of a structure of a layer of the part. The method further includes heating the green body part above a first temperature to remove the binder and the channel support and generate a brown body part having the internal channel generated from removal of the channel support agent and heating the brown body part above a second temperature to sinter the powder to generate the part having the internal channel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
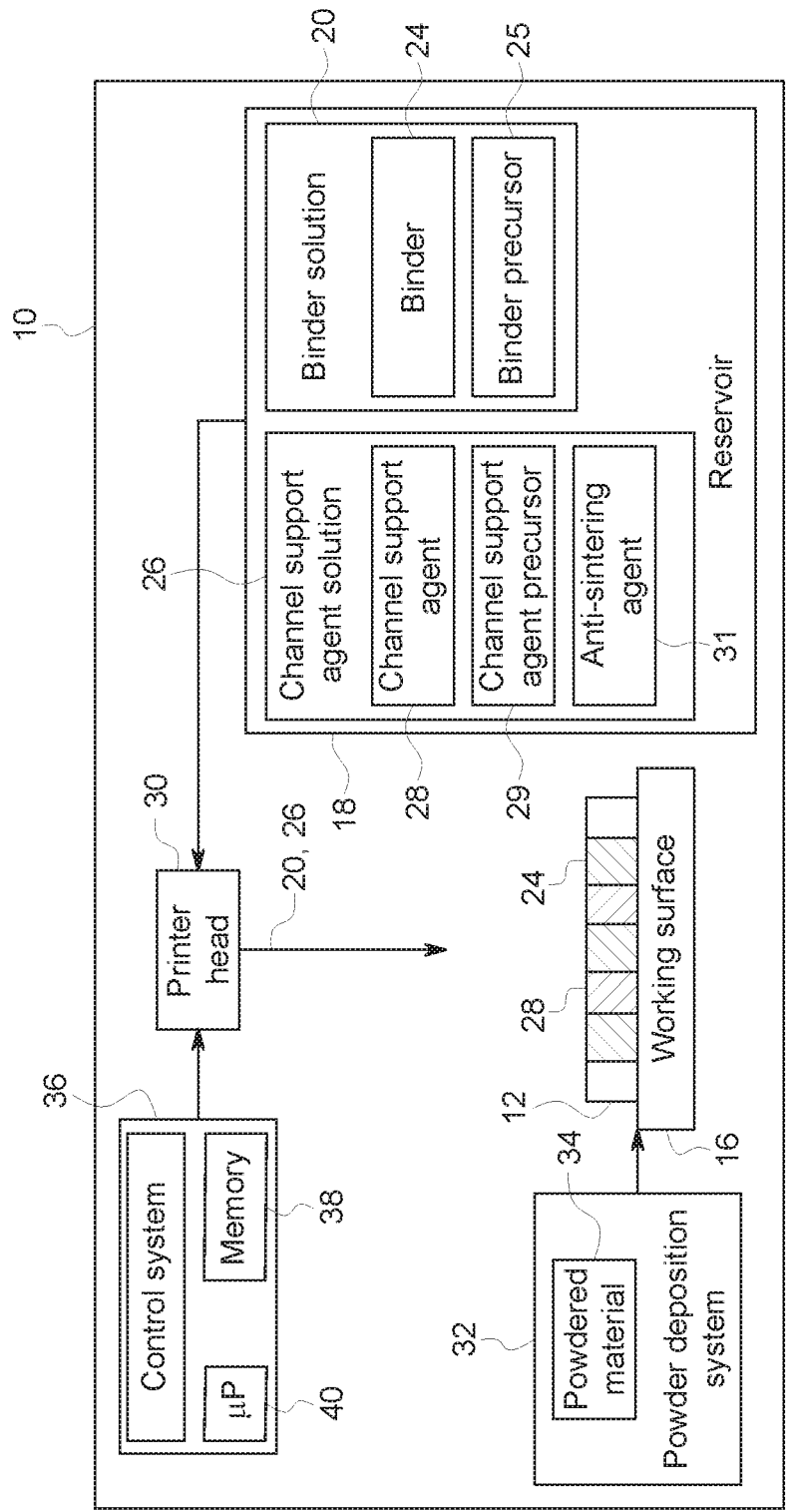
FIG. 1 is a block diagram of an embodiment of a binder jet printer used to print a part having internal channels.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, a "working surface" is intended to denote a surface onto which a powder bed layer or a channel support agent solution may be deposited onto during binder jet printing processes. The working surface may include a working platform of a binder jet printer, a layer of powder, or a binder printed layer. As used herein, a "channel support agent" is intended to denote a material that may be deposited onto the working surface using the binder jet printer that creates an internal channel within a consolidated part in situ upon removal. As used herein, an "internal channel" is intended to denote a cavity, void, or hollow passage that in an interior volume of a consolidated part that is in fluid communication with the exterior of the consolidated part.

There are numerous techniques for manufacturing articles, such as metal and ceramic parts used in a variety of machinery. For example, molding techniques, such as sand molding, cast molding, and/or injection molding, among others, may be used to manufacture metal and ceramic parts for machinery applications. As noted above, other techniques that may be used to manufacture metal and ceramic parts include additive manufacturing. For example, additive manufacturing techniques that may be used to manufacture articles include, but are not limited to, laser melting, laser sintering, and binder jetting. Additive manufacturing can be advantageous for fabricating parts compared to molding techniques due, in part, to the flexibility of materials that may be used, the ability to manufacture complex articles, and low manufacturing costs.

Unlike laser melting and laser sintering additive manufacturing techniques, which heat the material to consolidate and build layers of the material to form a printed part (e.g., metal or ceramic part), binder jetting uses a chemical binder to bond particles of the material into layers that form a green body of the printed part. As defined herein, the green body of the printed part is intended to denote a printed part that has not undergone heat treatment to remove the chemical binder. Chemical binding has been used in sand molding techniques to bond sand particles and form a sand mold that can be used to fabricate other parts. Similar to sand molding, in binder jet printing, the chemical binder is successively deposited into layers of powder to print the part. For example, the chemical binder (e.g., a polymeric adhesive) may be selectively deposited onto a powder bed in a pattern representative of a layer of the part being printed. Each printed layer may be cured (e.g., via heat, light, moisture, solvent evaporation, etc.) after printing to bond the particles of each layer together to form the green body part. After the green body part is fully formed, the chemical binder is removed during post-printing processes (e.g., debinding and sintering) to form a consolidated part. In certain post printing processes, the green body part may undergo a depowdering process to create internal passages within the printed green body part. The depowdering process removes portions of the powder that have not been bound (e.g., adhered) by the chemical binder. Metal powder remaining in the internal passages after depowdering may be removed using machining techniques.

However, depowdering of the green body part is generally done before heat treating (e.g., pre-sintering) the green body part. Heat treating the green body part removes the chemical binder and builds handling strength. Therefore, during a depowdering processes that forms internal channels, the green body part may have insufficient handling strength and be susceptible to damage. Additionally, the green body part may be machined to remove powder (e.g., metal and/or ceramic powder) that can remain in the internal channels after depowdering, which can affect the integrity of the green body part. Moreover, due to the microstructure of the internal channels, depowdering and machining may be tedious and laborious, adding time and cost to the manufacturing process and decreasing yields. However, it is presently recognized that by creating the internal channels in situ during printing of the green body part, as presently disclosed, defects in the consolidated part that can result from the depowdering process may be mitigated.

Disclosed herein are channel supports (i.e., sacrificial binders) that may be used during binder jet 3D printing to manufacture parts having internal channels within. As discussed in further detail below, the channel supports may be deposited onto or into portions of the layers of powder used to form the green body part and may be subsequently removed during heat treatment of the green body part to yield a consolidated part having internal channels. In this way, the presently disclosed technique enables the in situ formation of internal channels without depowdering and machining the green body part, which can reduce manufacturing cost and complexity, as well as improve production yields.

With the foregoing in mind, FIG. 1 is a block diagram of a binder jet printer 10 that may be used to selectively deposit a binder and a channel support into the portion of a layer 12 of powder (e.g., metal and/or ceramic) that is used to print an additively manufactured part, in accordance with embodiments of the present approach. In the illustrated embodiment, the binder jet printer 10 includes a working platform 16 (e.g., a stage) that supports the layer of powder 12, a reservoir 18 that stores a binder solution 20 having a binder 24 and/or or binder precursor 25, and a channel support agent solution 26 having a channel support agent 28 and/or a channel support agent precursor 29, a printer head 30 that is fluidly coupled to the reservoir 18, and a powder deposition system 32 that deposit a powdered material 34 to form the layer of powder 12. The binder precursor 25 and the channel support agent precursor 29 include monomers that may be polymerized in situ on the layer of powder 12 after deposition to form the binder 24. In certain embodiments, the channel support agent solution 26 includes an anti-sintering agent 31. The printer head 30 selectively deposits the binder solution 20 and/or the channel support agent solution 26 into the layer of powder 12 to print (e.g., selectively deposit) the binder 24 and/or the channel support agent 28, respectively, onto and into the layer 12 in a pattern that is representative of the layer of the part being printed.

The illustrated binder jet printer 10 includes a control system 36 for controlling operation of the binder jet printer 10. The control system 36 may include a distributed control system (DCS) or any computer-based workstation that is fully or partially automated. For example, the control system 36 can be any device employing a general purpose computer or an application-specific device, which may generally include memory circuitry 38 storing one or more instructions for controlling operation of the binder jet printer 10. The memory 38 may store CAD designs representative of a structure of the article being printed. The processor may include one or more processing devices (e.g., microprocessor 40), and the memory circuitry 38 may include one or more tangible, non-transitory, machine-readable media collectively storing instructions executable by the processing device 40 to enable the functionality described herein.

Figure 2:
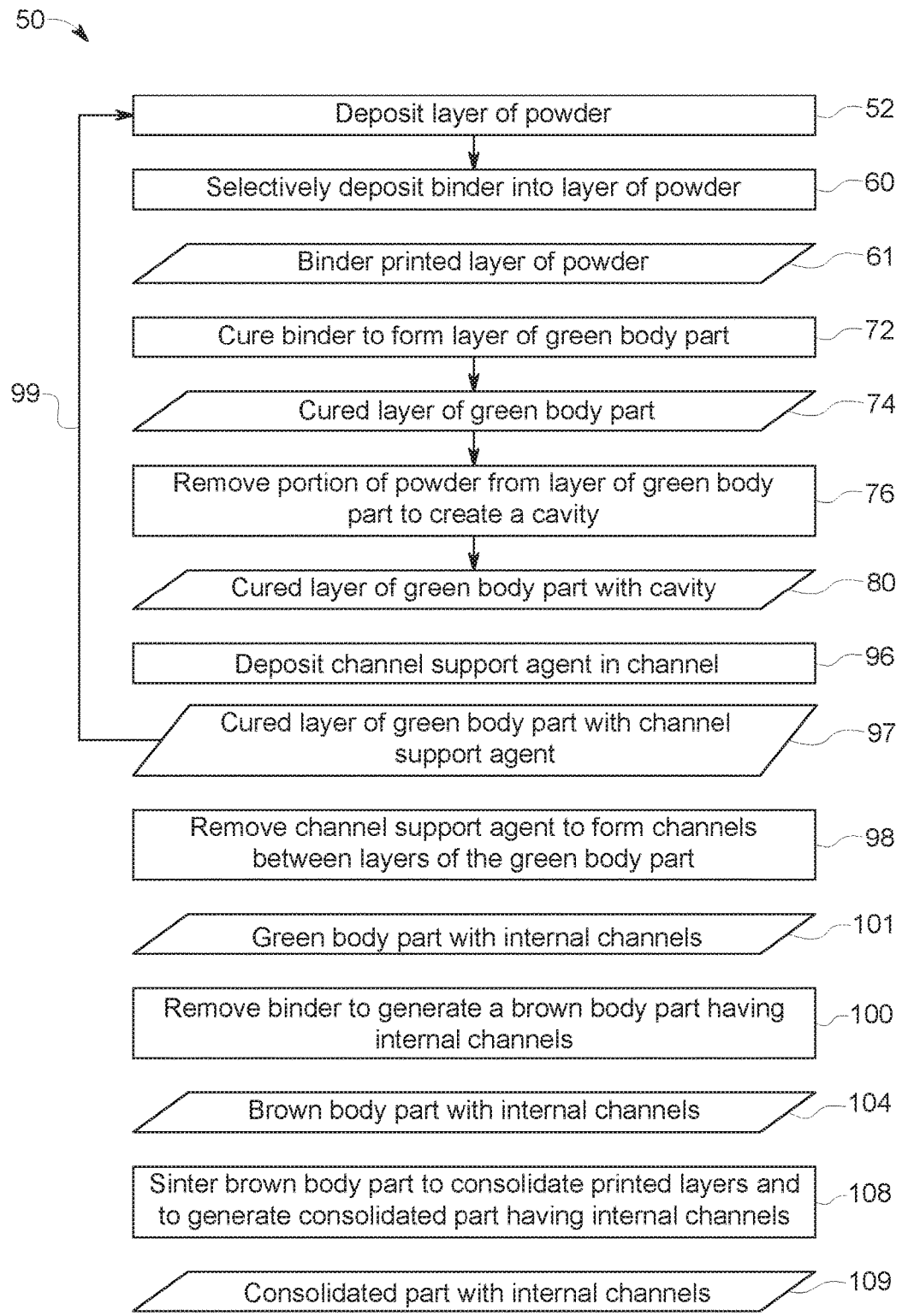
FIG. 2 is a flow diagram of an embodiment of a method of manufacturing a part via a binder jet printing process that forms a channel by removing a portion of powder from a printed layer and depositing a channel support.
Figure 3:
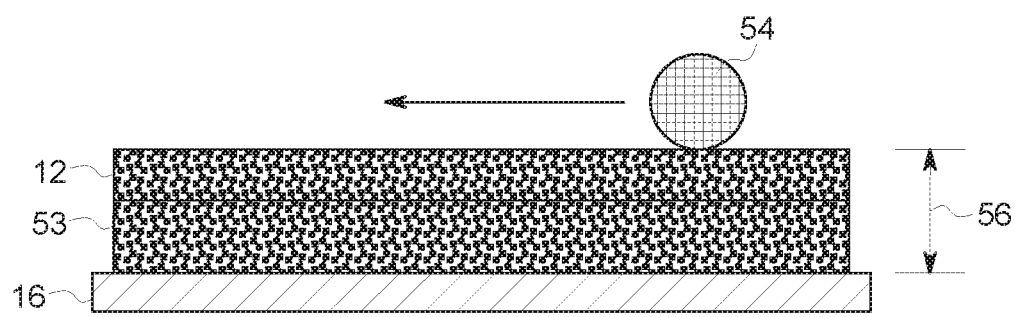
FIG. 3 is a schematic diagram of an embodiment of a layer of powder.

FIG. 2 is a block diagram depicting a method 50 for manufacturing an article via binder jet 3D printing using the channel support agent 28 to define channels within layers 12 of a green body part, in accordance with embodiments of the present approach. To facilitate discussion of aspects of the method 50 illustrated in FIG. 2, reference is made to structures in FIGS. 3-6, which generally correspond to certain steps of the illustrated method 50. The method 50 begins with depositing (block 52) a layer of the powder 12 that is used to manufacture an article of interest. For example, FIG. 3 is a cross-sectional view of the layer 12 (e.g., a powder bed) of the powdered material 34 (e.g., metallic and/or non-metallic powder) on a working surface. In certain embodiments, the working surface may be the working platform 16 of the binder jet printer 10 (e.g., when the layer 12 is the first layer of the green body part). In other embodiments, the working surface may be a previously printed layer 53, as illustrated in FIG. 3. The powdered material 34 may be deposited onto the working surface using the powder deposition system 32. In certain embodiments, the powder deposition system 32 deposits the layer 12 such that the layer 12 has a thickness 56 of between approximately 10 microns (μm) and approximately 200 μm (e.g., approximately 40 μm or less). However, in other embodiments, the thickness 56 of the layer 12 may be any suitable value.

The part to be printed may include a variety of parts having complex, 3D shapes, such as, but not limited to, fuel tips, fuel nozzles, shrouds, micro mixers, turbine blades, or any other suitable part. Therefore, the material 34 (e.g., metal and/or ceramic powder) used to print the article may vary depending on the type of article and the end use of the article (e.g., gas turbine engines, gasification systems, etc.).

The material 34 may include metallic and/or non-metallic materials. By way of non-limiting example, the material 34 may include: nickel alloys (e.g., Inconel 625, Inconel 718, René 108, René 80, René 142, René 195, and René M2, Marm-247); cobalt alloys (e.g., Hans 188 and L605); cobalt-chromium alloys, cast alloys: (e.g., X40, X45, and FSX414), titanium alloys, aluminum-based materials, tungsten, stainless steel, metal oxides, nitrides, carbides, borides, or any other suitable material and combinations thereof. In certain embodiments, the material 34 includes particles having a particle size distribution (e.g., $d_{50}$) that is between approximately 1 micron (μm) and approximately 75 μm. However, in other embodiments, the material 34 may utilize particles of any other suitable particle size distribution.

Following deposition of the layer of powder 12, the method 50 continues with selectively depositing (block 60) the binder 24 into portions of the layer 12 according to a predetermined pattern to generate a binder printed layer of powder 61. For example, the binder 24 may be selectively printed into the layer of powder 12 using the printer head 30. As mentioned, the printer head 30 is generally controlled (e.g. operated, guided) by the control system 36 based on a CAD design, which includes a representation of the layer 12 of the part being printed.

Figure 4:
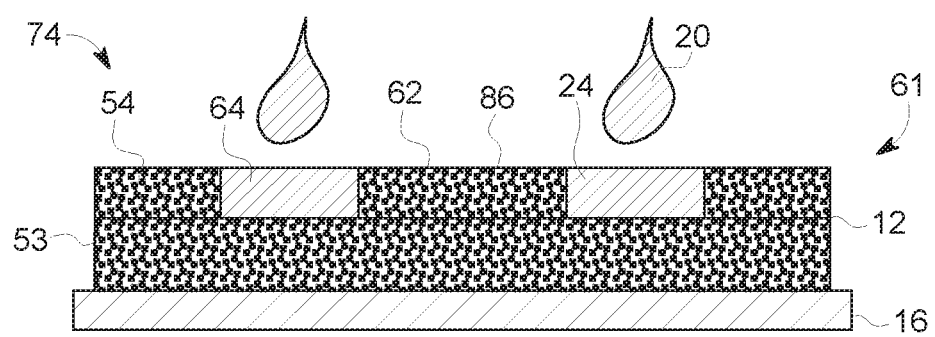
FIG. 4 is a schematic diagram of an embodiment of a binder-printed, layered structure resulting from various steps of the method of FIG. 2.

FIG. 4 is a cross-sectional view of the binder printed layer of powder 61 generated according to the acts of block 60 of the method 50. As illustrated, in the portions of the powder layer 12 that selectively receive the binder solution, the binder 24 coats the particles 62 in the powder layer 12, thereby generating binder-coated particles 64 within the powder layer 12. As discussed below, after curing (e.g., via solvent evaporation, exposure to moisture, exposure to light), the binder 24 bonds the binder-coated particles 64 (e.g., to one another, to the working surface 53) according to the printed pattern of binder solution 20 to form binder printed layer of powder 61 of the green body part 74.

The binder 24 may be selected from a class of thermoplastic or thermoset polymers that include, but are not limited to, polymers derived from unsaturated monomers. For example, the binder 24 may one or more polymers have the following formulas: $(CH_2CHR)_n$, where R=a proton (—H), hydroxyl (—OH), phenyl, alkyl, or aryl unit. The binder 24 may also include one or more mono-functional acrylic polymers having the formula $(CH_2—CR^2COOR^1)_n$, where $R^1$=an alkyl or aryl unit, and $R^2$=a —H or methyl (—CH$_3$) unit; di-acrylic polymers having the formula $[(CH_2—CR^2COO)_2—R^3]_n$, where $R^2$=a —H or —CH$_3$ unit and $R^3$=a divalent hydrocarbon radical; tri-acrylic polymers having the following formula $[(CH_2CR^1COO)_3—R^4]_n$, where $R^1$=—H or —CH$_3$ and $R^4$=a trivalent hydrocarbon radical and/or poly(alkylene carbonates) including co-polymeric alkylene carbonates, such as poly(ethylene-cyclohexene carbonate), poly(ethylene carbonate), poly(propylene carbonate, poly(cyclohexane carbonate), among others. In certain embodiments, the binder 24 may include poly(methylmethacrylate) (PMMA), polystyrene (PS), poly(vinyl alcohol) (PVA); poly(alkylene carbonates), for example QPAC® 25, 40, 100, and 130 from Empower Materials (located in New Castle, Del.), and polymers derived from hexanediol diacrylate (HDDA), trimethylolpropane triacrylate (TMPTA, for example, SR351 from Sartomer of Exton, Pa.), and diethylene glycol diacrylate (DGD).

As discussed above with reference to FIG. 1, the printer head 30 receives the binder solution 20 (e.g., ink) having the binder 24 and selectively prints (e.g., deposits, flash vaporizes and condenses) the binder 24 into portions of the layer of powder 12. Accordingly, the binder solution 20 may have certain properties that facilitate binder jet printing via the printer head 30. The binder solution 20 may include additives that facilitate deposition of the binder 24 into the layer 12. For example, in certain embodiments, the binder solution 20 includes one or more additives, including but not limited to: viscosity modifiers, dispersants, stabilizers, surfactants (e.g., surface active agents) or any other suitable additive that may facilitate jettability of the binder solution 20 and selective deposition of the binder 24 into the powder layer 12.

For example, in certain embodiments, the binder solution 20 may include surfactants. The surfactants may be ionic (e.g., zwitterionic, cationic, anionic) or non-ionic, depending on the properties of the binder 24 and/or the material 34, in different embodiments. By way of non-limiting example, the surfactant may be polypropoxy diethyl methylammonium chloride (e.g., VARIQUAT® CC-42NS, available from Evonik located in Essen, Germany) and/or a polyester/polyamine condensation polymer (e.g., Hypermer KD2, available from Croda Inc. located in Snaith, United Kingdom), in certain embodiments. In certain embodiments, the one or more additives may improve the wettability of the material 34 to facilitate coating the particles 62 of the powder with the binder 24. The one or more additives may also change (e.g., modify) the surface tension of the binder solution 20 to facilitate jettability of the binder solution 20. For example, in certain embodiments, the binder solution 20 is generally considered jettable if the Ohnesorge number (e.g., the ratio of viscous forces to inertial and surface tension forces) is between approximately 0.1 and approximately 1.

In certain embodiments, the one or more additives may also include a solvent that dissolves the binder 24. The solvent may be aqueous or non-aqueous, depending on the selected binder 24, as well as other additives that may be in the binder solution 20. The solvent is generally non-reactive (e.g., inert) such that it does not react with the powder material 34 (e.g., metal and/or ceramic powder), the binder 24, or any other additives that may be in the binder solution 20. Additionally, in general, the solvent should readily evaporate after selective deposition of the binder 24 into the powder layer 12, which may facilitate curing to bond together the binder-coated particles 64 of the printed layers 53. Example solvents of the binder solution 20 include, but are not limited to, water, methylene chloride ($CH_2Cl_2$), chloroform ($CHCl_3$), toluene, xylenes, mesitylene, anisole, 2-methoxy ethanol, butanol, diethylene glycol, tetrahydrofuran (THF), methyl ethyl ketone (MEK), trichloroethylene (TCE), or any other suitable solvent.

Following deposition of the layer 12 and the selective printing of the binder 24, as set forth in blocks 52 and 60 of FIG. 2, the illustrated method 50 continues with curing (block 72) the binder 24 to form a cured layer of the green body part 74, as illustrated in FIG. 4. For example, as discussed above, the selectively deposited binder solution 20 may be a mixture of the binder 24 (e.g., polymer) and a solvent. While a portion of the solvent in the binder solution 20 may be evaporated during deposition (e.g., printing) of the binder 24, a certain amount of the solvent may remain within the layer of powder 12. Therefore, in certain embodiments, the green body part 74 may be thermally cured (in a subsequent, post-print step) at a temperature that is suitable for evaporating the solvent remaining in the printed layer 53 and allows for efficient bonding of the printed layers 53 of the green body part 74.

In certain embodiments, the layer 53 of the green body part 74 may be cured via polymerization, wherein reactive monomers in the binder solution 20 polymerize to yield the binder 24. For example, the binder 24 may be polymerized in situ after selectively printing the binder solution 20 into the powder layer 12. Following deposition of the binder solution 20, the one or more binder precursors 25 (e.g., polymerizable monomers) in the binder solution 20 may be cured (e.g., reacted, cross-linked, polymerized) to form the printed layer 53 of the green body part. For example, in certain embodiments, the printed layer 53 may be exposed to heat, moisture, light, or any other suitable curing method that polymerizes the binder precursors 25 in the binder solution 20 to form the binder 24 in the printed layer 53. In certain embodiments, the binder solution 20 may include a radical initiator (e.g., azobisisobutyronitrile (AIBN)) to facilitate polymerization of the one or more polymerizable monomers. In one embodiment, the binder solution 20 includes binder precursors 25 selectively deposited into the powder layer 12 that cure (e.g., polymerize, cross-link) rapidly (e.g., on the order of seconds) without addition supplied energy.

As discussed above, it may be desirable to form internal channels (e.g., micro-cooling channels, drainage channels, fluid passageways) within the consolidated part. State of the art processes for forming internal channels during a binder-jet process generally involves depowdering a green body part to remove loose (e.g., unbound) powder 78 (i.e., portions of the layer 53 illustrated in FIG. 4, and other layers of the green body part 74, that are not bonded with the binder 24) once printing of all layers of the green body part 74 has been completed. This may include applying a vacuum to openings in an outer surface of the printed green body part 74 to draw the loose powder 78 out from within the printed green body part 74 thereby creating the internal channels. Additionally, machining techniques (e.g., electro-chemical machining, mechanical machining) can be used to remove any loose (e.g., unbound) powder 78 that remains within the internal channels after applying the vacuum. However, the green body part 74 may demonstrate insufficient handling strength during the depowdering and machining processes. Therefore, depowdering and machining may affect the integrity of the green body part 74 and may result in undesirable and/or unacceptable defects in the consolidated part, reducing part yields. However, it is now recognized that by creating (e.g., defining and clearing) the internal passages in situ during printing of the green body part 74 as presently disclosed, depowdering and machining the green body part 74 can be avoided, along with the undesirable effects on part quality and yield associated therewith.

Figure 5:
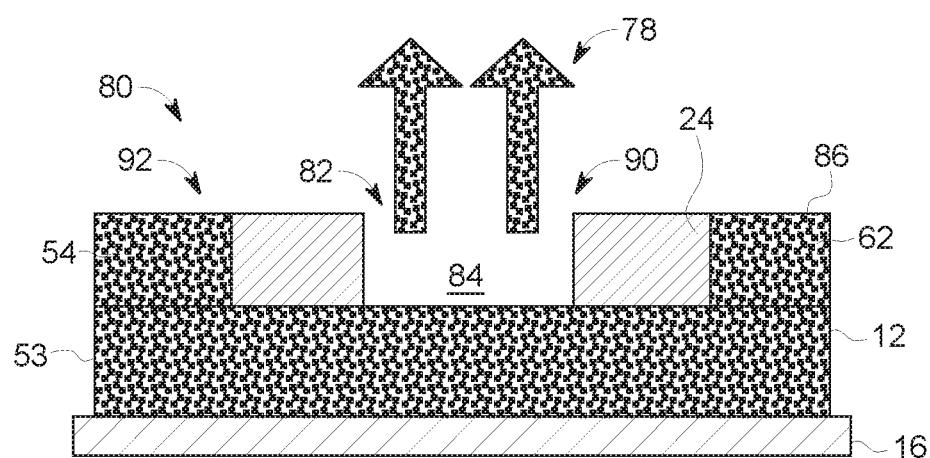
FIG. 5 is a schematic diagram of an embodiment of a binder-printed, layered structure resulting from various steps of the method of FIG. 2, the binder-printed, layered structure having a cavity created by removing an unbound portion of the layer of powder.

With the foregoing in mind, the method 50 illustrated in FIG. 2 includes removing (block 76) the unbound or loose powder 78 from the cured layer of the green body part 74 to generate a cured layer of the green body part 80 having a cavity that corresponds to a portion of a channel (e.g., a microchannel) after completion of printing the green body part 74, 80. For example, in certain embodiments, as illustrated in FIG. 5, the loose powder 78 of the material 34 is removed from the cured printed layer 53, thereby leaving a cavity 82 (e.g., an opening, void, gap, hollow region) in the printed layer 53. The cavity 82 is part of a larger, internal channel 84 in the consolidated (e.g., finished, sintered) part, as discussed in further detail below. The cavity 82 and/or the channel 84 may have any suitable cross-sectional shape such as, but not limited to, circular, semi-circular, square, star, rectangular, triangular, or any other suitable geometric shape. In certain embodiments, the loose powder 78 of the powder material 34 in the cured printed layer 53 may be removed by using a vacuum. For example, a vacuum may be applied to a surface 86 (as illustrated in FIG. 4), to draw the loose powder 78 of the material 34 away from the printed layer 53, leaving the cavity 82 (e.g. a void that is representative of a portion of the channel 84) between sections 90, 92 of the binder-coated particles 64 (as illustrated in FIG. 5) in the layer 53. It may be appreciated that, in certain embodiments, the cavity 82 may be part of a larger channel 84 of the green body part 74 that may span more than one layer 53 of the green body part 74

Following removal of the portion 78 of the material 34 from the printed layer 53, the method 50 illustrated in FIG. 2 continues with depositing (block 96) a channel support agent 28 within the cavity 82. For example, similar to deposition of the binder 24, the channel support agent solution 26 may be selectively deposited into the cavity 82 using the same printer head 30, or another printer head 30, in certain embodiments. The channel support agent 28 generally undergoes a transformation (e.g., physical and/or chemical transformation) to solidify (e.g., harden, cure, freeze) and temporarily fill the cavity 82, thereby generating a cured layer of the green body part 97 having the channel support agent 28. For example, the channel support agent precursor 29 may include monomers that are cured (e.g., via application of heat, light, moisture) to polymerize and form the channel support agent 28 (e.g., a substantially solid structure) within the cavity 82. In certain embodiments, the channel support agent 28 may solidify after evaporation of a solvent used in the channel support agent solution 26.

Figure 6:
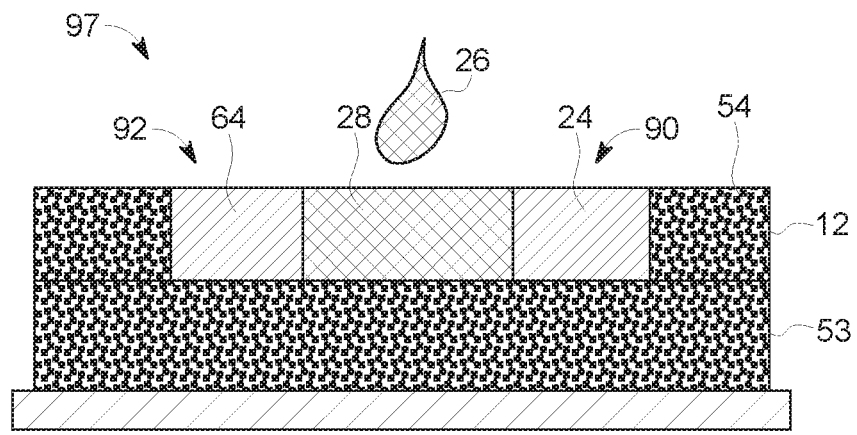
FIG. 6 is a schematic diagram of an embodiment of the binder-printed, layered structure of FIG. 5 having the channel support within the cavity.

FIG. 6 is a cross-sectional view of the printed layer 53 having the channel support agent 28 disposed within the cavity 82 of the printed layer 53, defining a portion of a channel 84 of a green body part 74. The channel support agent 28 may provide a temporary (e.g., removable) spacer in the printed layer 53 to allow subsequent deposition and printing of the layers 12 to build the green body part 74. That is, the channel support agent 28 blocks the powder material 34 from filling the cavity 82 or the channel 84 when additional layers of the powder 12 are deposited on or above the printed layer 53 (e.g., in block 52). The channel support agent solution 26 may be deposited onto the printed layer 53 according to a predetermined pattern that defines the cavity 82 in the layer 53, and, thereby, defines the resulting channel 84 in the green body part 74.

The channel support agent 28 may be selected from organic compounds that include thermoplastic or thermoset polymers waxes, or any other suitable compound that generally thermally decompose and/or melt at temperatures between approximately 100 degrees Celsius (° C.) and approximately 400° C., typically well-below a sintering temperature of the powder material 34. By way of non-limiting example, the channel support agent 28 may include acrylonitrile butadiene styrene (ABS); nylon, polylactic acid (PLA), polybenzimidazole, polycarbonate, polyetherether ketone, polyetherimide, polyethylene, polyphenylene oxide, polyphenylene sulfide, polypropylene, polystyrene, polyvinyl chloride, acrylates, polyurethanes, polyesters, or combinations thereof. Similar to the printing of the binder solution 20 onto the layer of powder 12 discussed above, the printer head 30 may receive the channel support agent solution 26 having the channel support agent 28 (or the precursors 29 of the channel support agent 28) and forms (e.g., prints, deposits, inserts) the channel support agent 28 into the cavity 82 in the printed layer 53. The channel support agent solution 24 may have certain properties that facilitate deposition via the printer head 30. The channel support agent solution 26 may include additives that may facilitate deposition of the channel support agent 28 into the cavity 82. For example, the channel support agent solution 20 may include one or more additives such as viscosity modifiers, dispersants, stabilizers, surfactants (e.g., surface active agents) or any other suitable additive that may facilitate jettability of the channel support agent solution 26 and formation of the channel support agent 28 within the cavity 82 in the printed layer 53.

In certain embodiments, the one or more additives of the channel support agent solution 26 may also include a solvent that dissolves a channel support agent 28. The solvent may be aqueous or non-aqueous, depending on the selected channel support agent 28, as well as other additives that may be in the channel support agent solution 26. The solvent is generally non-reactive (e.g., inert) such that it does not react with the powder material 34 (e.g., metal and/or ceramic powder), the binder 24, channel support agent 28, or any other additives that may be in the channel support agent solution 26. Additionally, in certain embodiments, the solvent of the channel support agent solution 26 readily evaporates after selective deposition into the cavity 82 to facilitate solidification of the channel support agent 28 within the cavity 82.

Returning to FIG. 2, as indicated by the arrow 99, the method 50 typically involves the repetition of the acts of blocks 52, 60, 72, 76, and 96 to continue fabricating in a layer-by-layer manner until all of the layers of the entire green body part 74 have been printed. The binder 24 bonds (e.g., adheres, anchors, binds) each successive layer 61 and provides a degree of strength (e.g., green strength) to the printed article to improve the integrity of the structure of the green body part during post-printing processes (e.g., debinding, sintering, etc.). That is, the green strength provided by the binder 24 maintains bonding between the powder material 34 within each of the layers 61, and blocks (e.g., resists, prevents) delamination of the layers 61 during handling and post-printing processing of the green body part 74. Similarly, the channel support agent 28 may temporarily fill (e.g., occupy) a corresponding cavity 82 of any suitable number of successive layers 80, which collectively define the channel 84 of the green body part 74, and occupy these cavities 82 to enable construction of the remainder of the green body part 74.

As discussed above, the channel support agent 28 generally fills any suitable number of cavities 82 in any suitable number of printed layers 61 to allow subsequent deposition and binder jetting of additional layers of the powder 12 and building of the green body part 74, as set forth in blocks 52, 60, 72, 76, and 96 of the method 50 illustrated in FIG. 2. Once the desired number of printed layers 61 are deposited, the method 50 includes removing the channel support agent 28 from the cavity 82 of the green body part 74 (block 98) to create internal channels 84 within a printed green body part 101. For example, in certain embodiments the printed green body part 101 may be heated to remove (e.g., decompose, melt, liquefy, vaporize, gasify, and/or sublime) the channel support agent 28. For example, in certain embodiments, heating the channel support agent 28 may cause the channel support agent 28 to undergo a phase change from a solid to a liquid and/or a gas. For example, during post printing processes, the printed green body part 101 may be heated to decompose and/or melt the channel support agent 28 to facilitate removal of the channel support agent 28 through one or more drainage openings in the printed green body part 101, thereby leaving internal passages/channels 84 defined by the cavities 82 of the layers 61 that may serve as channels (e.g., micro-channels, cooling channels) in the consolidated (e.g., completed) additively manufactured part.

In embodiments where the channel support agent 28 is removed in the liquid phase, the channel support agent 28 may be collected and re-used for printing to create the internal passages in situ. The printed green body part 101 may also have a certain degree of porosity (e.g., between approximately 15% and approximately 50%) that may facilitate removal (e.g., leeching) of the channel support agent 28 from the printed green body part 101. For example, in embodiments where the channel support agent 28 is the removed from the printed green body part 101 in the gas phase (e.g., via a release of gaseous thermal decomposition products), these decomposition products may be readily released from within the interior of the printed green body part 101 through the porous microstructure of the printed green body part 101.

The method 50 illustrated in FIG. 2 also includes removing (block 100) the binder 24 from the printed green body part 101 to create handling strength and generate a brown body part 104 having the desired cavities 82 and channels 84. During removal of the binder 24 (e.g., debinding), the green body part 84 may be heated to break down the binder 24 into smaller compounds having a lower molecular weight compared to the binder 24. For example, the printed green body part 101 may be heated to a temperature that is approximately 500° C. or less, such as between approximately 250° C. and approximately 450° C., to facilitate removal of the binder 24. The conditions to which the printed green body part 101 is exposed during debinding (e.g., removal of the binder 24 from the printed layers 61 of the printed green body part 101) decomposes the binder 24 into smaller molecules that may be readily released from the printed green body part 101 and generates the brown body part 104 having a substantial portion (e.g., approximately 95%, approximately 96%, approximately 97%, approximately 98%) of the binder 24 removed. In certain embodiments, a portion of the binder 24 and/or decomposition products of the binder 24 (e.g., oxides, such as silicon oxide) may remain in the brown body part 104 and may improve bonding of the powder material 34 within the brown body part 104, enabling an improved brown strength that maintains the structure of the brown body part 104 during handling between debinding and sintering.

Finally, the method 50 illustrated in FIG. 2 concludes with sintering (block 108) the brown body part to consolidate the powder material 34 to generate a consolidated additively manufactured part 109 having internal channels (e.g., micro-cooling channels). During sintering, the brown body part 104 is generally exposed to a concentrated source of energy (e.g., a laser, electron beam, or any other suitable energy source) that heats the brown body part 104 and consolidates (e.g., densifies, connects) the powdered material 34 of the printed layers 53 of the brown body 104 to form the consolidated part 109 (e.g., substantially solid part) having a density that is greater than the density of the brown body part 104 Sintering imparts strength and integrity to the brown body part 104, such that the consolidated part 109 is suitable for use in machinery for its intended application (e.g., as a component of a gas turbine engine or a gasification system). The sintering temperature is a temperature that is generally less than (e.g., approximately 30% of) a melting point of the powdered material 34, such that the particles of the powdered material 34 soften and form connections (e.g., necks or bridges) that bind together neighboring particles in the brown body part 104. In general, sintering temperatures may be in excess of 1000° C., depending on the properties of the powder material 34 used to fabricate the part. For example, in certain embodiments, when the powdered material 34 is a nickel alloy (e.g., INCONEL® 625), the sintering temperature may be between approximately 1250° C.-1270° C. The consolidated part 109 may be Hot Isotactic Pressurized (HIP) post sintering to obtain close to full densities (density>99.9%).

Figure 7:
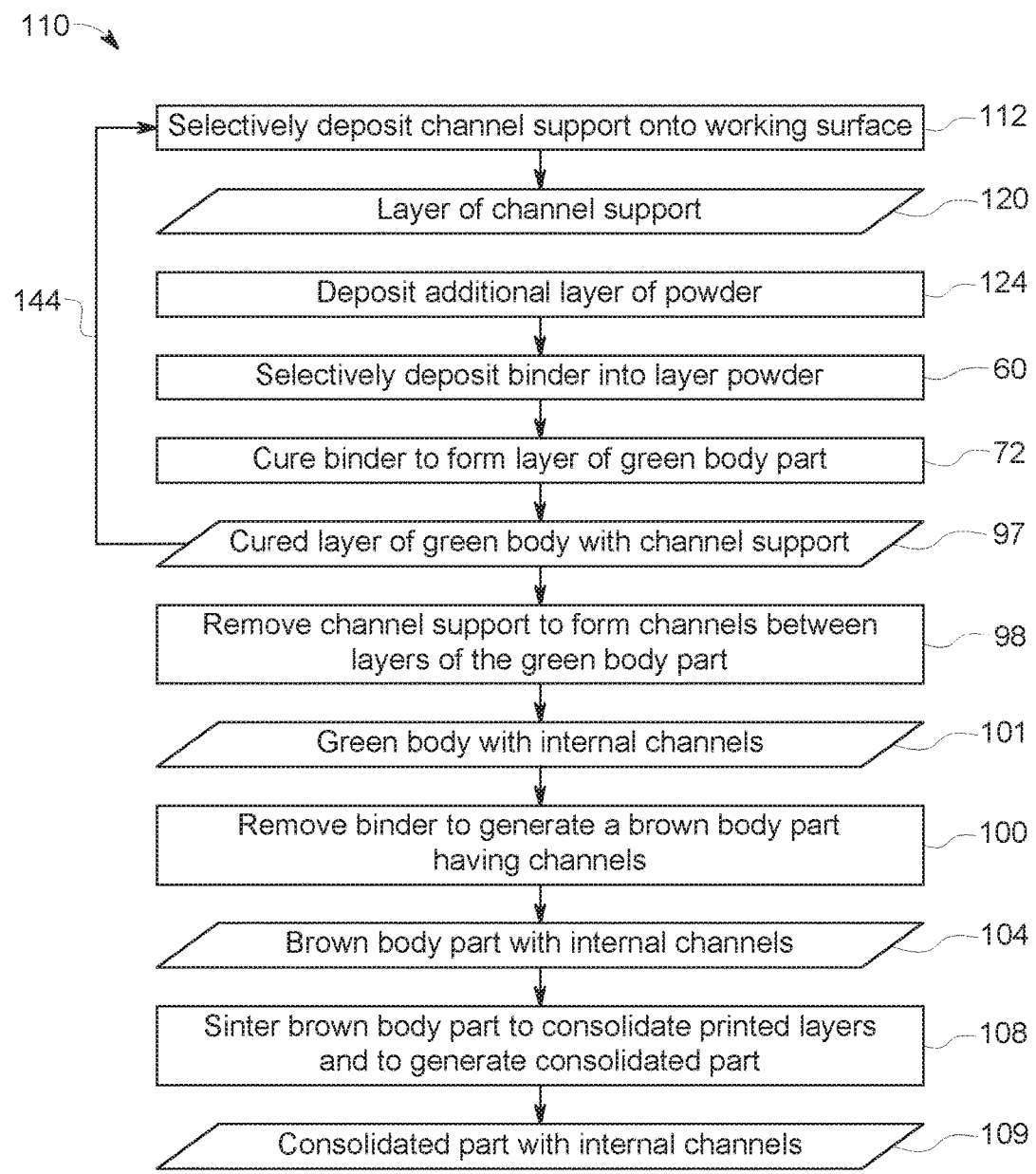
FIG. 7 is a flow diagram of an embodiment of a method of manufacturing a part via a binder jet printing process that forms a channel by depositing a channel support into a layer of powder.

In alternative to the method 50 illustrated in FIG. 2, in certain embodiments, the internal channels 84 of a consolidated part (e.g., the consolidated part 109) can be formed by depositing the channel support agent 28 onto or into the layer of powder 12, rather into a cavity (e.g., the cavity 82) from which the powdered material 34 has been removed. For example, FIG. 7 illustrates an alternative method 110 for generating internal channels in situ while additively manufacturing (e.g., binder jetting) a part, in accordance with embodiments of the present approach. In contrast with the method 50 of FIG. 2, in the method 110 of FIG. 7, an unbound or loose portion 78 of the powdered material 34 is not removed from the printed layer 53, as set forth with respect to block 76 of FIG. 2 and as illustrated in FIG. 5. Similar to the method 50 of FIG. 2, the method 110 of FIG. 7 begins by depositing the layer of powder 12 onto the working platform 16 of the binder jet printer 10, as set forth above with respect to block 52 of the method 50 and shown in FIG. 3.

Figure 8:
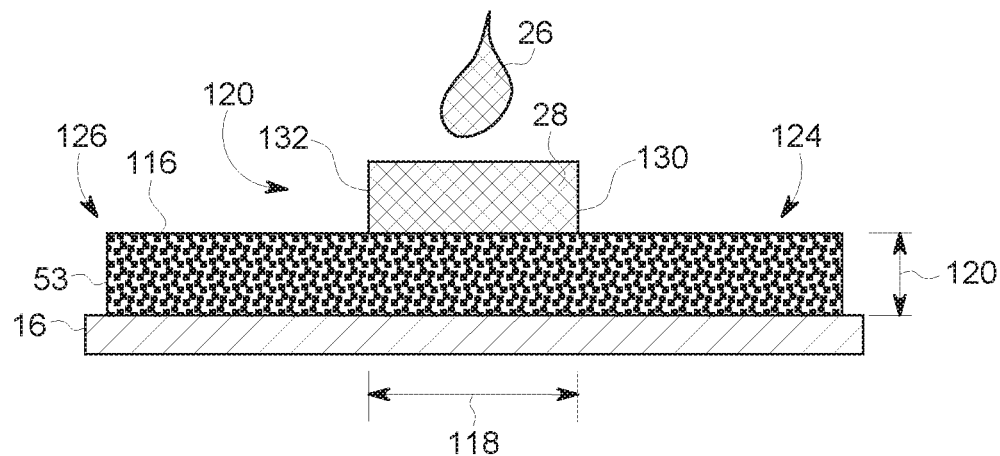
FIG. 8 is a schematic diagram of an embodiment of layered structure resulting from various steps of the method of FIG. 7, the layered structure having a layer of powder and a layer of the channel support.

Following deposition of the layer of powder 12, the method 110 illustrated in FIG. 7 includes selectively depositing (block 112) the channel support agent 28 onto the working surface 53 (e.g., the layer of powder 12, a previously printed layer, or the working platform 16 of the binder jet printer 10). For example, as shown in FIG. 8, the channel support agent 28 (or channel support agent precursor 29) is deposited onto a surface 116 (e.g., on top) of the working surface 53. As illustrated in FIG. 8, for such embodiments, the channel support agent 28 is not printed (e.g., not deposited) into a cavity 82 generated by the removal of a portion (e.g., the loose powder 78) of the powder material 34. Rather, as illustrated in FIG. 8, the channel support agent 28 is selectively printed directly onto (e.g., above, on top of) a portion 118 of the working surface 53. The portion 118 may provide support for the channel support agent 28 such that the channel support agent 28 may rest on the surface 116 of the portion 118 of the working surface 53. In certain embodiments, when the working surface 53 is the layer of powder 12, the channel support agent 28 may penetrate through a portion of the layer of powder 12. For example, the channel support agent 28 may penetrate through between approximately 5% and 20% of a thickness 120 of the layer of powder 12. In certain embodiments, for example when subsequent layers of channel support agent 28 are deposited to build the green body part 74, the channel support agent 28 of a previous (e.g., underlying) layer provides support for the subsequent (e.g., overlaying) layer of the channel support agent 28. Upon deposition, the channel support agent 28 may solidify (e.g., as a result of solvent evaporation or a temperature change such as from an elevated temperature to a cooler temperature) to create a layer of channel support 120 representative of the internal channel 84 of the consolidated part 109. The channel support agent 28 may extend away from the surface 116 of the working surface 53, thereby creating a steps 124, 126 defined by the surface 116 and lateral sides 130, 132, respectively, of the channel support agent 28.

Figure 9:
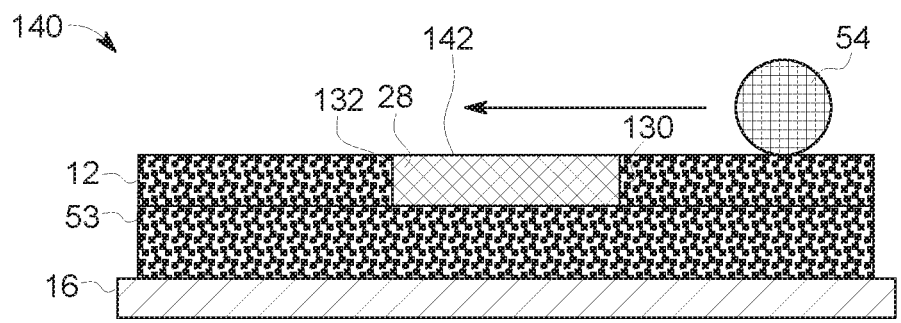
FIG. 9 is a schematic diagram of an embodiment of a layered structure resulting from various steps of the method of FIG. 7, the layered structure having the channel support nested within a layer of powder.

The method 110 illustrated in FIG. 7 continues with depositing (block 124) a layer of powder material 34 over portions of surface 116 of the working surface 53 not covered by the channel support agent 28. The layer of powder material 34 may fill the steps 124, 126 on the surface 116 of the underlying working surface 53 with the powder material 34. For example, FIG. 9 is a cross-sectional view of a layered structure 140 having the layer 120 of the channel support agent 28 nested within (e.g., laterally surrounded by, flanked by) the layer of the powder material 34. That is, the lateral sides 130, 132 of the channel support agent 28, as illustrated in FIG. 8, are surrounded by (e.g., contacted by, disposed adjacent to) the powder material 34. As illustrated, at least a portion of a support surface 142 of the channel support agent 28 may remain free of the powder material 34 after subsequent deposition of the powder material 34, which enables subsequent layers of channel support agent 28 to be disposed on (e.g., directly above, adjacent) the illustrated channel support agent 28 during fabrication of the green body part 74.

Following deposition of the subsequent layer of the powder material 34 across the surface 116, the method 110 illustrated in FIG. 7 includes selectively depositing the binder solution 20, which includes binder 24 or precursors thereof, into the powder material 34 (e.g., the metal and/or ceramic powder) and curing to form the printed layer 53 of the green body part 74, as discussed above and as illustrated in FIG. 10. As with the method 50 illustrated in FIG. 2, the method 110 of FIG. 7 typically involves the repetition of the acts of blocks 60, 72, and 112, as indicated by the arrow 144, to continue building up the part in a layer-by-layer manner until a desired number of layers have been printed to generate the green body part 97, in which the channel support agent 28 defines and occupies internal channels 84 the green body part 97, defining the internal channels 84 of the eventual consolidated part 109.

Figure 10:
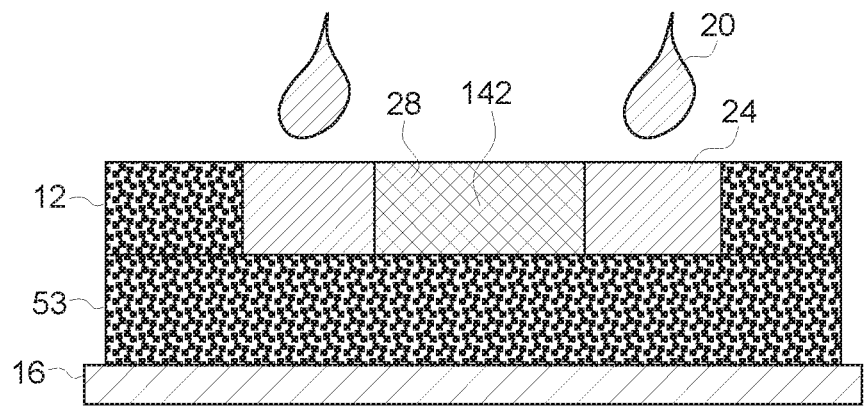
FIG. 10 is a schematic diagram of an embodiment of a printed layered structure resulting from various steps of the method of FIG. 7, the printed layered structure having the channel support disposed between portions of binder-coated particles.
Figure 11:
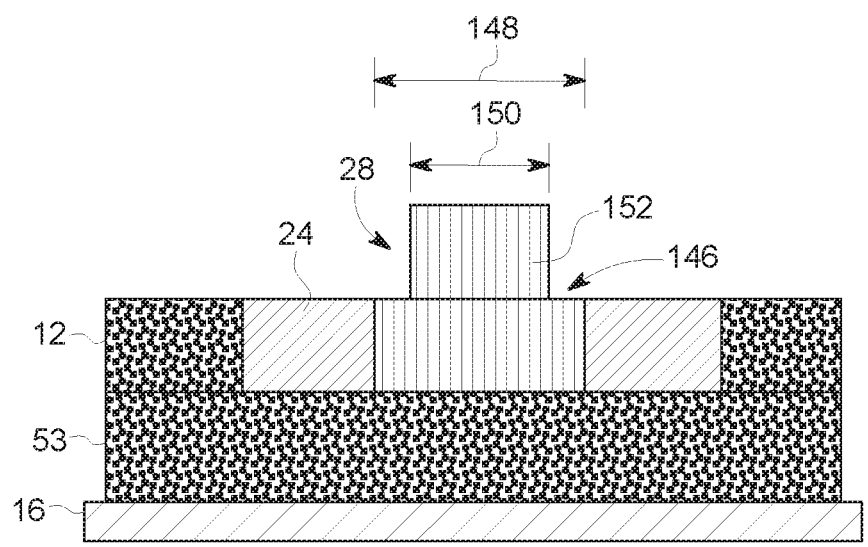
FIG. 11 is a schematic diagram of an embodiment of the printed layered structure of FIG. 10 having multiple layers of channel support.

Excess powder material 34 that is inadvertently deposited on the support surface 142 of the channel support agent 28 during the powder deposition (e.g., block 60 of FIG. 7) may be removed before or after selectively printing binder solution 20 to portions of the newly deposited layer of powder material 34. As such, the support surface 142 may receive subsequent layers of channel support agent 28 to create the internal channels 84 in situ during printing of the green body part 97, as illustrated in FIG. 10. The subsequent layers of channel support agent 28 may have similar or variable cross-sectional areas depending on the desired cross-sectional area of the internal channel. For example, as illustrated in FIG. 11, a first layer 146 of the channel support agent 28 has a first dimension 148 that is greater than a second dimension 150 of a second layer 152 (e.g., adjacent layer). In certain embodiments, the second dimension 150 may be greater than the first dimension 148. In other embodiments, the dimensions 148, 150 may be the same.

Once the desired number of layers have been printed with the binder 24 and the channel support agent 28, the method 110 includes removing the channel support agent 28 from the green body part to form the internal channels between the printed layers 61 of the green body part 97, removing the binder 24 to generate the brown body part 104, and sintering the brown body part 104 to generate the consolidated part 109, as discussed above with respect to FIG. 2.

Figure 12:
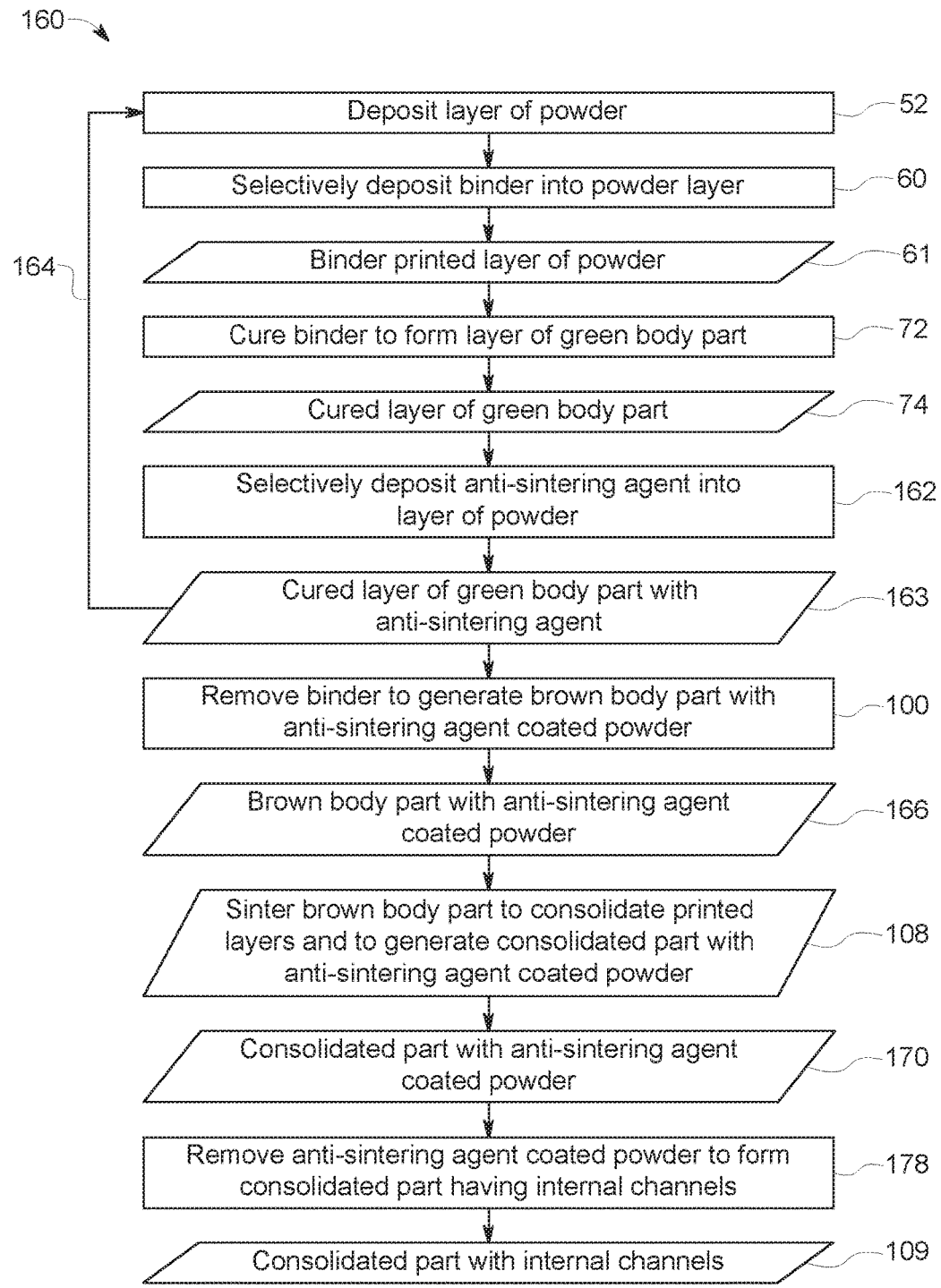
FIG. 12 is a flow diagram of an embodiment of a method of manufacturing a part via a binder jet printing process that forms a channel by selectively depositing an anti-sintering compound into a layer of powder.

As discussed above, the internal channels 84 within the consolidated part 109 may be created in situ during printing of the green body part 74 including a channel support material that may be removed during post-printing processes, thereby leaving voids within the green body part that form the internal channels 84 within the consolidated part 74. For example, the channel support agent 28 may solidify after printing onto the layer of powder 12 or the cavity 82 and may undergo a phase change (e.g., from solid to liquid and/or gas) during heat treatment (e.g., pre-sintering processes) of the green body part. In certain embodiments, as illustrated by the method 160 of FIG. 12, rather than utilize a channel support 28 that is later removed (as indicated in FIGS. 2 and 7), an anti-sintering agent 31 may be selectively applied to portions of a deposited layer of powdered material to block (e.g., prevent) particles in select regions of the layer of powder material 34 from being able to effectively sinter with neighboring particles as the brown body part 104 is thermally treated to form the consolidated part 109 (as indicated in FIG. 12). For example, where selectively deposited, the anti-sintering agent 31 prevents consolidation (e.g., softening, necking, bridging) of the particles of the powder material 34 during sintering. The non-consolidated particles of the powder material 34 (e.g., loose, unsintered particles) may be removed (e.g., vacuumed out) after sintering to create the internal channels in the consolidated part.

FIG. 12 is a block diagram depicting a method 160 that uses an anti-sintering agent 31 that prevents consolidation of portions of the printed layers 53 of the green body part 74 to create internal channels 84 in situ. Similar to the method 50 of FIG. 2, the method 160 of FIG. 12 begins with depositing (block 52) the layer of powder 12, selectively depositing (block 60) the binder 24 into the layer of powder 12, and then curing (block 72) the binder 24 to form the printed layer 61 of the green body part 74, as discussed above.

Following curing of the binder 24 in block 72, the method 160 of FIG. 12 continues with selectively depositing (block 162) the anti-sintering agent 31 onto or into the printed layer 61 of the green body part 74 to generate a printed layer 163 of the green body part having the anti-sintering agent 31. For example, the anti-sintering agent 31 may be selectively printed into the layer 61 (or the layer of powder) using the printer head 30 based on a CAD design that includes representation of the layer 61 of the consolidated part 109 being fabricated. It should be noted that, in certain embodiments, the anti-sintering agent 31 may be deposited into the layer of powder 12 before or after printing the layer of powder 12 with the binder 24. That is, the acts of block 162 may be performed before or after depositing the binder 24 into the layer of powder 12 according to block 52.

Figure 13:
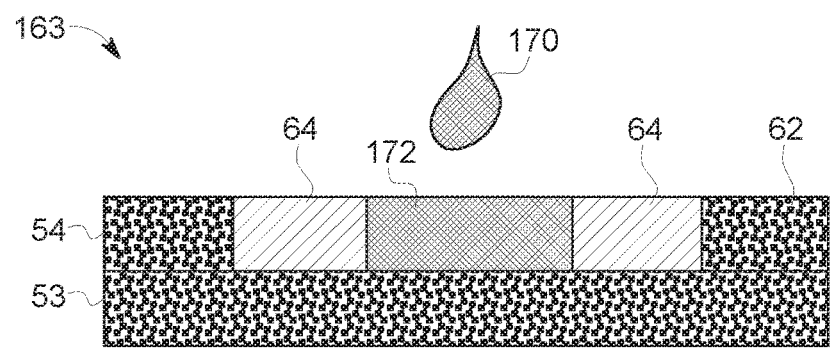
FIG. 13 is a schematic diagram of an embodiment of a layered structure resulting from various steps of the method of FIG. 12, the layered structure including both anti-sintering compound-coated particles and binder-coated particles.

FIG. 13 is a cross-sectional view of the printed layer 163 having particles of the material 34 coated with the anti-sintering agent 31. The anti-sintering agent 31 coats a portion of the particles 62 in the printed layer 163, thereby generating anti-sintering particles 172. The anti-sintering particles 172 may be nested between portions of the printed layer 163 having the binder coated particles 64. For such embodiments, the anti-sintering agent 31 may generally define a pattern representative of desired cavities in the printed layer 163, which correspond to desired internal channels 84 in the green body part 74.

The anti-sintering agent 31 may include oxides, nitrides, and borides that prevent consolidation of the material 34 during sintering of the brown body part. By way of non-limiting example, the anti-sintering agent 31 may include aluminum oxides, magnesium oxides, yttrium oxides, zirconium oxides, titanium oxides, boron nitride, or any other suitable anti-sintering agent, and combinations thereof. In certain embodiments, the anti-sintering agent 31 may include braze stop-off compounds. As discussed above with reference to FIG. 1, the printer head 30 receives the channel support agent solution 26, which includes the anti-sintering agent 31, and prints the anti-sintering agent 31 into the layer of powder 12 in the pattern that is representative of the internal channels.

In certain embodiments, the channel support agent solution 26 may include one or more additives may improve the wettability of the material 34 to facilitate coating the particles of the material 34 with the anti-sintering agent 31. The one or more additives may also change (e.g., modify) the surface tension of the channel support agent solution 26 to facilitate jettability of the channel support agent solution 26, similar to the binder solution 20.

The channel support agent solution 26 may also include a solvent that dissolves the anti-sintering agent 170. The solvent is generally non-reactive (e.g., inert) such that it does not react with the material 34 (e.g., metal and/or ceramic powder), the binder 24, the anti-sintering agent 170, or any other additives that may be in the channel support agent solution 26. Additionally, the solvent of the channel support agent solution 26 should readily evaporate after selective deposition into the layer of powder 12. Example solvents that may be used in the channel support agent solution 26 include, but are not limited to, water, methylene chloride ($CH_2Cl_2$), chloroform ($CHCl_3$), toluene, xylenes, mesitylene, anisole, 2-methoxy ethanol, butanol, diethylene glycol, tetrahydrofuran (THF), methyl ethyl ketone (MEK), trichloroethylene (TCE), or any other suitable solvent.

Returning to FIG. 12, the method 160 may repeat the acts of blocks 52, 60, 72, and 162, as indicated by the arrow 164, to continue building up the green body part 74 in a layer-by-layer manner until a desired number of layers have been printed, as discussed above. Once the desired green body part 74 is printed, the method 160 includes removing (block 100) the binder 24 to generate a brown body part 166 having the anti-sintering agent coated particles and sintering (block 108) the brown body part 166 to generate a consolidated part 170 having the anti-sintering agent coated powder.

In contrast to the methods 50 and 110, the anti-sintering agent 31 is not removed from the green body part 74 during heat treatment (e.g., debinding and/or sintering). That is, for the embodiment of the method 160 illustrated in FIG. 12, the anti-sintering agent 31 does not undergo a phase change from a solid to a liquid/gas during heat treatment of the green body part. Rather the channel support agent 28 (e.g., the anti-sintering particles 172) remains in the green body part through consolidation of the printed layers 53. Maintaining the channel support agent 28 (e.g., the anti-sintering agent 31) within the printed green body part 101 all the way though sintering may be advantageous. For example, once sintered, the consolidated part 109 has a greater handling strength compared to the printed green body part 101 and the brown body part 104. As such, removal of the channel support agent 28 from the consolidated part 109 may not affect the structural integrity of the printed green/brown body part due, in part, to insufficient handling strength. As discussed above, the anti-sintering agent 170 keeps the anti-sintering particles 172 from consolidating (e.g., necking) during sintering (e.g., according to block 108).

After sintering, the layers 53 of the brown body part 104 are consolidated to generate the consolidated part 170, leaving the anti-sintering particles 172 unconsolidated (e.g., unbound, uncoupled, loose). Therefore, the method 160 concludes with removing the unconsolidated anti-sintering particles 172 to clear the defined internal channels 84 within the consolidated part (block 178). The unconsolidated anti-sintering particles 172 may be removed through drainage holes in the consolidated part by applying a vacuum to the consolidated part. In certain embodiments, air may be blown in through the drainage holes to remove any residual anti-sintering particles 172 that remain within the consolidated part 109 after applying the vacuum. In this way, the internal channels 84 of the consolidated part 109 are able to be created in situ, and the undesirable effects of depowdering and machining the green body part 74 can be avoided.

Figure 14:
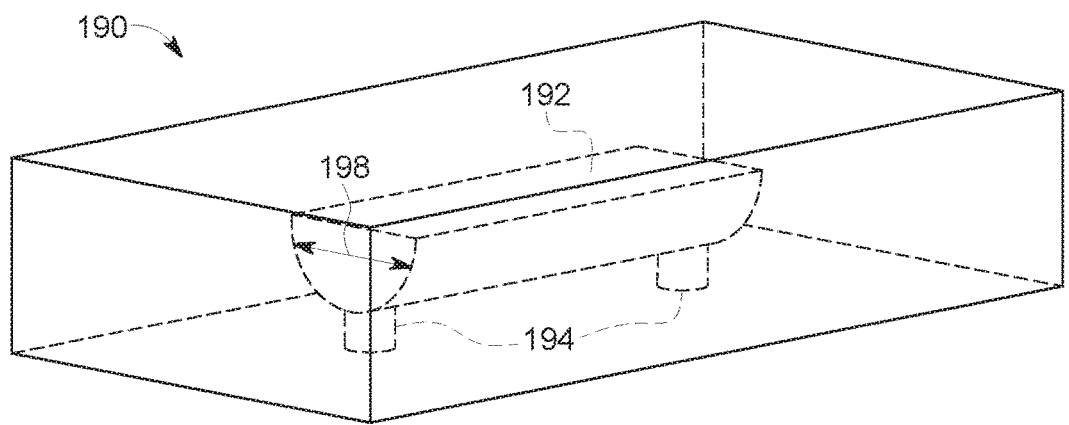
FIG. 14 is a schematic diagram of an embodiment of a consolidated binder-jet printed part having an internal cavity resulting from various steps of the methods of FIGS. 2, 7, and 12.

FIG. 14 is a diagram of a consolidated part 190 having an internal channel 192 created according to the acts of the methods 50, 110, and 160 illustrated in FIG. 2, 7, or 12, respectively. While the consolidated part 190 illustrated in FIG. 14 includes a single internal channel 192, it should be appreciated that the consolidated part 190 may have any suitable number of internal channels 192. For example, the consolidated part 190 may have 1, 2, 3, 4, 5, 6, 7, 8, 9, 10, or more internal channels 192. In the illustrated embodiment, the internal channel 192 has a semi-circular cross-sectional shape. However, in other embodiments, the internal channel 192 may have any cross-sectional shape such as circular, square, triangular, rectangular, or any other suitable geometric cross-sectional shape. The consolidated part 190 may also include drainage holes 194 that allow removal of the channel support agent 28 (e.g., during heating of the green body part 74 during debinding and/or sintering) or anti-sintering particles 31 (e.g., after sintering the brown body 104). It may be appreciated that the drainage holes 194 may be created in a manner similar to the internal channel 192, as discussed above.

Using the channel support agent 28 and/or anti-sintering agent 31, as presently disclosed, may facilitate the formation of additively manufactured parts having channels with smaller dimensions compared to channels created using depowdering and machining techniques. For example, in certain embodiments, the disclosed techniques enable the formation of internal channels (e.g., internal channels 192) having a width 198 that is between approximately 25% and approximately 75% smaller than a width of internal channels generated using depowdering and machining techniques. By specific example, in certain embodiments, the width 198 of an internal channel 192 may be between approximately 50 micrometers (µm) and approximately 5000 µm. Additionally, printing the channel support agent 28 and/or the anti-sintering agent 31 onto or into the layer of powder 12 enables enhanced flexibility in the geometry of the internal channels 192 within the consolidated part 190.

As discussed above, the techniques disclosed herein may be used in binder jetting additive manufacturing to form internal channels in situ within a printed article. Disclosed channel support agents include organic compounds that solidify after deposition into or onto the layers of the printed green body part, and that undergo a phase change (e.g., from a solid to a liquid/gas) under post-printing heat treatment conditions, such that the channel support agent may be removed from the interior of the printed green body part to yield the desired internal channels within the green body part. In other embodiments, an anti-sintering agent may be selectively applied to portions of layers of the printed green body part, and can block consolidation of particles under sintering conditions. The unconsolidated particles may be subsequently removed to yield the desired internal channels within the consolidated part. Using the disclosed techniques, an additively manufactured consolidated part may be substantially-free from defects that commonly result from attempting to form internal channels using depowdering and/or machining of a green body part.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of binder jet printing a part comprising:
depositing a layer of a powder on a working surface;
selectively printing a binder solution comprising a binder into the layer of powder in a first pattern to generate a printed layer, wherein the pattern is representative of a structure of a layer of the part;
selectively printing a channel support agent solution comprising a channel support agent into the layer of powder to generate a green body, wherein the channel support agent is selectively printed in a second pattern representative of an internal channel of the part;
heating the green body part above a first temperature to remove the binder and generate a brown body part; and
heating the brown body part above a second temperature to sinter the powder to generate the part having the internal channel generated from removal of the channel support agent.

2. The method of binder jet printing the part of claim 1, wherein heating the green body part above the first temperature thermally decomposes that channel support agent such that the channel support agent is removed from the green body part in a vapor phase.

3. The method of binder jet printing the part of claim 1, wherein heating the green body part above the first temperature thermally melts that channel support agent such that the channel support agent is removed from the green body part in a liquid phase.

4. The method of binder jet printing the part of claim 1, wherein the channel support agent is an anti-sintering agent disposed over a portion of the layer of powder, and comprising removing the portion of the layer of powder after heating the brown body above the second temperature.

5. The method of binder jet printing the part of claim 4, wherein the anti-sintering agent comprises a metal oxide, nitride, boride, carbide, or a combination thereof.

6. The method of binder jet printing the part of claim 1, comprising removing a portion of the powder from the layer to create a cavity within the layer of the powder before selectively printing the channel support agent solution.

7. The method of binder jet printing the part of claim 6, wherein the channel support agent fills the cavity.

8. The method of binder jet printing the part of claim 1, wherein the channel support agent comprises an aliphatic polymer, an acrylic polymer, a wax, or a combination thereof.

9. The method of binder jet printing the part of claim 1, wherein the brown body is free of the channel support agent before heating the brown body part above the second temperature.

10. The method of binder jet printing the part of claim 1, wherein the internal channel is between approximately 50 microns and approximately 500 microns in at least one dimension.

11. The method of binder jet printing the part of claim 1, wherein the layer of powder has a thickness of between approximately 10 microns and approximately 200 microns.

12. A method of binder jet printing a part comprising:
selectively printing a channel support agent solution comprising a channel support agent onto a working surface in a first pattern to generate a channel support layer, wherein the first pattern is representative of an internal channel of the part;
depositing a layer of a powder on the working surface around the channel support agent;
selectively printing a binder solution comprising a binder into the layer of the powder in a second pattern to generate a printed layer of a green body part, wherein the second pattern is representative of a structure of a layer of the part;
heating the green body part above a first temperature to remove the binder and the channel support and generate a brown body part having the internal channel generated from removal of the channel support agent; and
heating the brown body part above a second temperature to sinter the powder to generate the part having the internal channel.

13. The method of binder jet printing the part of claim 12, wherein the layer of the powder is deposited around the channel support agent such that a thickness of the layer of the powder is substantially equal to a thickness of the channel support agent.

14. The method of binder jet printing the part of claim 12, comprising selectively depositing the channel support agent solution on top of the channel support agent of a previously printed layer of the green body part.

15. The method of binder jet printing the part of claim 12, comprising removing the channel support agent from the brown body part before heating the brown body part above the second temperature.

16. The method of binder jet printing the part of claim 12, wherein the channel support agent comprises an aliphatic thermoplastic polymer, an acrylic polymer, a wax, or a combination thereof.

17. The method of binder jet printing the part of claim 12, wherein heating the green body part above the first temperature thermally decomposes that channel support agent such that the channel support agent is removed from the green body part in a vapor phase.

18. The method of binder jet printing the part of claim 12, wherein heating the green body part above the first temperature thermally melts that channel support agent such that the channel support agent is removed from the green body part in a liquid phase.

* * * * *